(12) United States Patent
Nakabayashi et al.

(10) Patent No.: US 7,646,182 B2
(45) Date of Patent: Jan. 12, 2010

(54) POWER SUPPLY APPARATUS

(75) Inventors: Hirokazu Nakabayashi, Tokyo (JP);
Kenji Fujiwara, Tokyo (JP); Hiroshi Ito, Tokyo (JP); Naoki Nishio, Tokyo (JP)

(73) Assignee: Mitsubishi Electric Corporation, Chiyoda-Ku, Tokyo (JP)

( * ) Notice: Subject to any disclaimer, the term of this patent is extended or adjusted under 35 U.S.C. 154(b) by 0 days.

(21) Appl. No.: 11/659,209

(22) PCT Filed: Mar. 29, 2006

(86) PCT No.: PCT/JP2006/006517

§ 371 (c)(1),
(2), (4) Date: Aug. 23, 2007

(87) PCT Pub. No.: WO2007/110954

PCT Pub. Date: Oct. 4, 2007

(65) Prior Publication Data

US 2009/0085537 A1    Apr. 2, 2009

(51) Int. Cl.
*G05F 1/40* (2006.01)
(52) U.S. Cl. .................. 323/272; 323/285; 363/98
(58) Field of Classification Search .......... 323/206, 323/225, 272, 284, 285; 363/98
See application file for complete search history.

(56) References Cited

U.S. PATENT DOCUMENTS

| 6,373,735 | B2* | 4/2002 | Usui | 363/89 |
| 2008/0130336 | A1* | 6/2008 | Taguchi | 363/125 |
| 2008/0304298 | A1* | 12/2008 | Toba et al. | 363/56.01 |
| 2008/0304301 | A1* | 12/2008 | Nishio et al. | 363/132 |

FOREIGN PATENT DOCUMENTS

| JP | 60-165743 A | 8/1985 |
| JP | 62-210861 A | 9/1987 |
| JP | 03-218262 A | 9/1991 |
| JP | 09-084333 A | 3/1997 |
| JP | 11-018429 A | 1/1999 |
| JP | 11-274001 A | 10/1999 |
| JP | 2000-092858 A | 3/2000 |
| JP | 2002-093974 A | 3/2002 |
| JP | 2002-300770 A | 10/2002 |
| JP | 2003-243865 A | 8/2003 |
| JP | 2003-333835 A | 11/2003 |

* cited by examiner

*Primary Examiner*—Jessica Han
(74) *Attorney, Agent, or Firm*—Buchanan Ingersoll & Rooney PC

(57) ABSTRACT

A first booster circuit and a second booster circuit include input capacitors, reactors, diodes, switch elements, and output capacitors, and are arranged to be symmetric to each other on a positive side and a negative side. The reactors are magnetically coupled to each other. With such configuration, the switch elements are on/off controlled simultaneously based on terminal voltages of the input capacitors and the output capacitors.

6 Claims, 8 Drawing Sheets $X1 = 1 - \dfrac{VC1}{Vref}$   $X2 = [Vref - VC3]_{PI}$   $X3 = [\dfrac{Vs}{2} - VC1]_{PI}$

DS1 = X1 + X2   DS2 = X1 + X2 + X3

$X1 = 1 - \dfrac{VC2}{Vref}$   $X2 = [Vref - VC4]_{PI}$   $X3 = [\dfrac{Vs}{2} - VC2]_{PI}$

DS1 = X1 + X2 + X3   DS2 = X1 + X2

POWER SUPPLY APPARATUS

TECHNICAL FIELD

The present invention relates to a power supply apparatus, and more particularly, to a power supply apparatus that boosts DC voltage by switching.

BACKGROUND ART

Patent Document 1 mentioned below is an example of a power supply apparatus that boosts DC voltage by switching in conventional techniques. The power supply apparatus ("power supply system" in the patent document) comprises a first power supply, a voltage converter that converts voltage outputted from the first power supply, a second power supply to which the voltage from the converter is applied, an electric load system that receives voltage from at least one of the voltage converter and the second power supply, and a controller that controls the voltage converter so that when the system is shifted from a first state that output current from the voltage converter is lower than a current value during an ordinary operation to a second state that the output current is recovered, the output voltage from the voltage converter is maintained high at least during a predetermined period.

In the power supply system, an auxiliary system that is comprised of the voltage converter and the load system connected to the first power supply serving as a main power supply and the second power supply is configured. When voltage supplied from the first power supply to the voltage converter is decreased and the output current from the voltage converter is a low current value and then becomes the current value during the ordinary operation, the second power supply is charged by voltage from the voltage converter that is higher than ordinary one. The power supply system has an advantage that the charge amount of the auxiliary system is recovered earlier with a simple configuration.

Patent Document 1: Japanese Patent Application Laid-Open No. 2003-333835

DISCLOSURE OF INVENTION

Problem to be Solved by the Invention

While the power supply system disclosed in the Patent Document 1 obtains higher voltage than inputs with simple circuit configuration, voltage applied to a switching element and a diode that constitute a booster circuit is the maximum voltage of the output voltage. If the input voltage and the output voltage become higher, voltage (rated voltage) required for the switching element and the diode is increased. Therefore, high withstand voltage elements that withstand such demand must be utilized.

Since such high withstand voltage elements have an inferior switching property, when the high withstand voltage switching elements are utilized, loss can be increased. High withstand voltage capacitors inserted between positive and negative DC buses on the input side of the booster circuit and high withstand voltage capacitors inserted between the positive and negative DC buses on the output side of the booster circuit must be utilized. Parts can become larger.

The present invention has been achieved in view of the aforementioned problems. An object of the present invention is to provide a power supply apparatus that suppresses use of high withstand voltage parts and exhibits high efficiency, especially excellent power conversion efficiency by use of general-purpose parts with excellent performance while avoiding larger and expensive devices caused by use of special-purpose parts such as the high withstand voltage parts.

Means for Solving Problem

To solve the above problems and to achieve the object, a power supply apparatus according to one aspect of the present invention boosts an output of a DC power supply connected to an input terminal and supplies a predetermined DC output to a load connected to an output terminal. The power supply apparatus includes a booster circuit that has a first booster circuit and a second booster circuit each of which includes an input capacitor, a reactor, a diode, a switch element, and an output capacitor, in which the reactors of the first and the second booster circuits are magnetically coupled to each other, terminals of a pair of input capacitors that the input capacitor in the first booster circuit is serially connected to the input capacitor in the second booster circuit are input terminals, terminals of a pair of output capacitors that the output capacitor in the first booster circuit is serially connected to the output capacitor in the second booster circuit are output terminals, and a connected terminal of the output capacitors is an intermediate voltage terminal; a control circuit that controls the booster circuit; and a voltage measuring unit that directly or indirectly measures one of voltages across the input capacitors and the output capacitors in the first and the second booster circuits and voltages across the pair of the input capacitors and the pair of the output capacitors. The control circuit on/off controls simultaneously the switch elements in the first and the second booster circuits based on measured results of the voltage measuring unit.

Effect of the Invention

According to a power supply apparatus of the present invention, a reactor included in a first booster circuit connected to the positive terminal side of a DC power supply is magnetically coupled to a reactor included in a second booster circuit connected to the negative terminal side of the DC power supply. Based on voltages across input capacitors and output capacitors in the first and the second booster circuits, respective switch elements included in the first and the second booster circuits are on-off controlled at the same time. Voltage applied to elements that constitute the first and the second booster circuits is about a half of one of input voltage and output voltage. Therefore, the following effects can be achieved. Use of high withstand voltage parts is suppressed and a larger and expensive device caused by use of special-purpose parts such as high withstand voltage parts is avoided. Further, since general-purpose parts with excellent performance can be utilized, an efficient power supply apparatus which has excellent power conversion efficiency is provided.

EXPLANATIONS OF LETTERS OR NUMERALS

Figure 1:
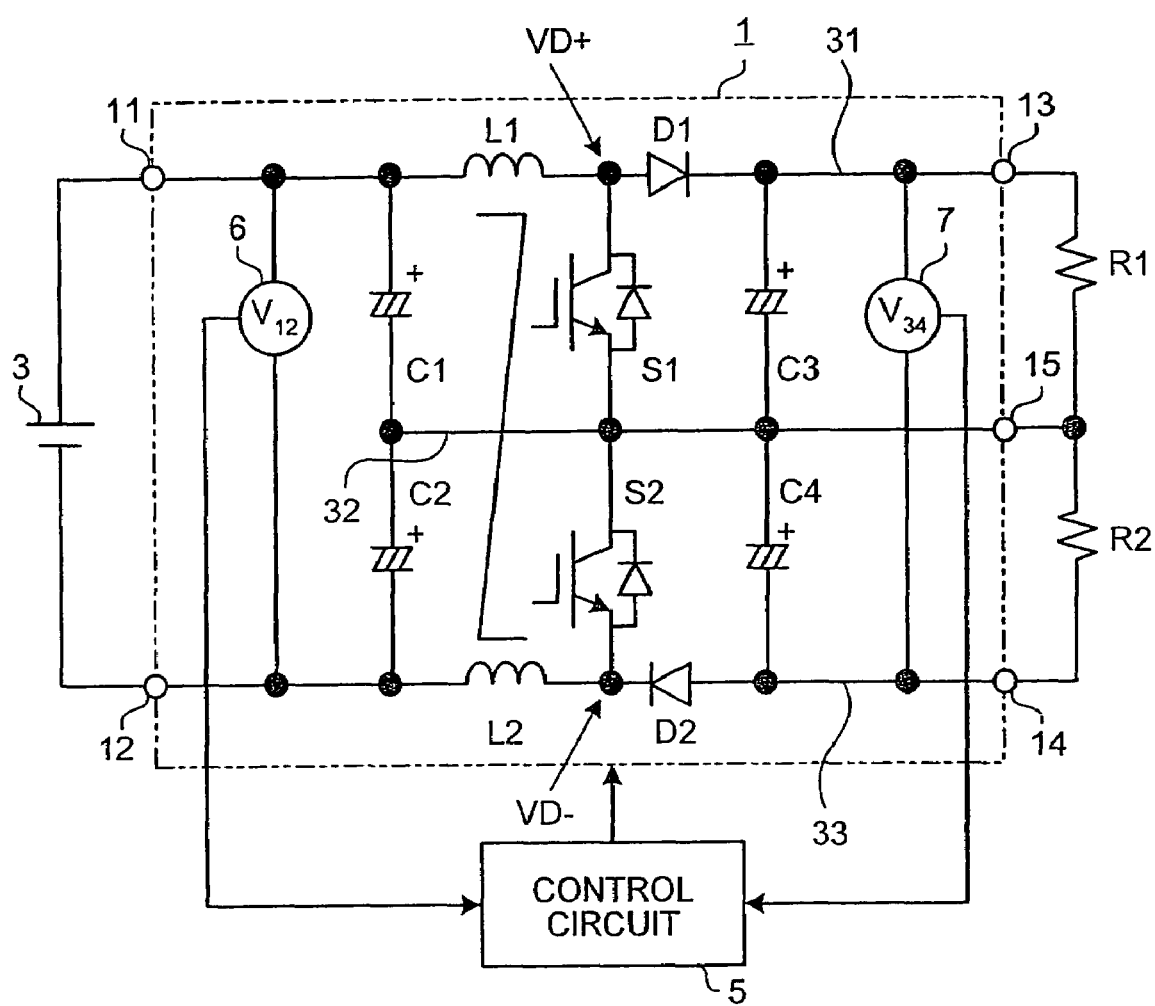
FIG. 1 is a circuit configuration diagram of a power supply apparatus according to a first embodiment of the present invention.

1 Booster circuit
2 Three-level inverter
3 DC power supply
4 System power supply
5 Control circuit
6, 7, 8a, 8b, 8c, 8d Voltage measuring unit
11, 12 DC input terminal
13, 14, 21, 22 Output terminal
15, 19 Intermediate voltage terminal
17, 18 Input terminal
31, 33 DC bus
32 Intermediate potential line
C1 Capacitor
C1 to C5 Capacitor
D1 to D4 Diode
L1, L2 Reactor
L3 Inductor

BEST MODE(S) FOR CARRYING OUT THE INVENTION

Exemplary embodiments of a power supply apparatus according to the present invention will be explained below in detail with reference to the accompanying drawings. Note that the invention is not limited to the embodiments. In addition, the circuit configuration described below is only an example, and it can be variously modified without departing from the technical scope of the present invention.

First Embodiment

FIG. 1 is a circuit configuration diagram of a power supply apparatus according to a first embodiment of the present invention. In FIG. 1, the power supply apparatus is configured to include a booster circuit 1, a DC power supply 3 such as a solar battery or a fuel cell that is connected to DC input terminals 11, 12 of the booster circuit 1, and a control circuit 5 that controls the booster circuit 1. According to the circuit configuration shown in FIG. 1, a load R1 to which outputs of the DC power supply 3 are supplied is connected between an output terminal 13 and an intermediate voltage terminal 15 in the booster circuit 1. A load R2 is connected between an output terminal 14 and the intermediate voltage terminal 15 in the booster circuit 1.

A configuration of the booster circuit that constitutes the power supply apparatus shown in FIG. 1 will be described. The booster circuit 1 shown in FIG. 1 includes a first booster circuit that is comprised of a capacitor C1, a reactor L1, a diode D1, a switch element S1, and a capacitor C3 and a second booster circuit that is comprised of a capacitor C2, a reactor L2, a diode D2, a switch element S2, and a capacitor C4. These first and second booster circuits are disposed vertically to be symmetric to each other.

In the first booster circuit, from the near side of the DC power supply 3 (the input terminal 11), one terminals of the capacitor C1, the switch element S1 that a diode is antiparallelly connected to a switch element such as an IGBT, and the capacitor C3 are connected to a DC bus 31 that connects the input terminal 11 to the output terminal 13 on the positive terminal side. The other terminals thereof are connected to an intermediate potential line 32. The reactor L1 is inserted between the one terminal of the capacitor C1 and the one terminal of the switch element S1. The diode D1 is inserted between the one terminal of the switch element S1 and the one terminal of the capacitor C3 in a flow direction of DC current supplied from the DC power supply 3, i.e., inserted so that the anode is connected to the one terminal of the switch element S1 and the cathode is connected to the one terminal of the capacitor C3.

Similarly, in the second booster circuit, from the near side of the DC power supply 3 (input terminal 12), one terminals of the capacitor C2, the switch element S2 that a diode is antiparallelly connected to a switch element such as an IGBT, and the capacitor C4 are connected to a DC bus 33 that connects the input terminal 12 to the output terminal 14 on the negative terminal side. The other terminals thereof are connected to the intermediate potential line 32. The reactor L2 is inserted between the one terminal of the capacitor C2 and the one terminal of the switch element S2. The diode D2 is inserted between the one terminal of the switch element S2 and the one terminal of the capacitor C4 in a flow direction of the DC current supplied from the DC power supply 3, i.e., inserted so that the cathode is connected to the one terminal of the switch element S2 and the anode is connected to the one terminal of the capacitor C4. The reactor L1 is magnetically coupled to the reactor L2, and they serve as a transformer.

As a result of the configuration shown in FIG. 1, the capacitors C1, C2 serially connected are inserted between the input terminals 11 and 12. The capacitors C1, C2 function as a pair of input capacitors that roughly divide the DC voltage supplied from the DC power supply 3 in half and hold the respective voltages. The capacitors C3, C4 serially connected are inserted between the output terminals 13 and 14. The capacitors C3, C4 function as a pair of output capacitors that supply the respectively held voltages to the loads R1, R2. A voltage measuring unit 6 that directly or indirectly measures voltage across the serially connected circuit of the capacitors C1, C2 that constitute the input capacitor pair is provided between the input terminals 11 and 12. A voltage measuring unit 7 that directly or indirectly measures voltage across the serially connected circuit of the capacitors C3, C4 that constitute the output capacitor pair is provided between the output terminals 13 and 14. Measured outputs of these measuring units are outputted to the control circuit 5 and contribute to control of the booster circuit 1.

Figure 2:
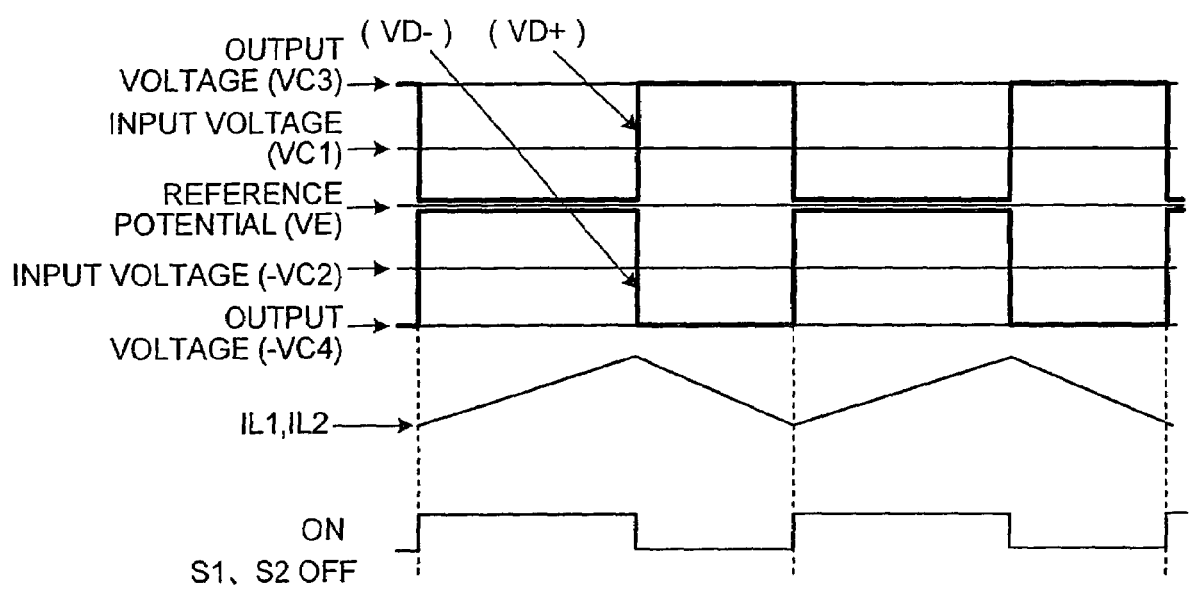
FIG. 2 is a timing chart for explaining the operation of the power supply apparatus shown in FIG. 1.

An operation of the power supply apparatus shown in FIG. 1 will be described with reference to FIGS. 1 and 2. FIG. 2 is a timing chart for explaining the operation of the power supply apparatus shown in FIG. 1. Voltages or currents in the respective relevant parts in the circuit shown in FIG. 1 are represented as follows.

VC1: Voltage across capacitor C1
VC2: Voltage across capacitor C2
VC3: Voltage across capacitor C3
VC4: Voltage across capacitor C4
VE: Reference potential (Potential of intermediate potential line)
VL1: Voltage across reactor L1

VL2: Voltage across reactor L2
IL1: Current passing through reactor L1
IL2: Current passing through reactor L2

With reference to FIG. 1, when the switch elements S1, S2 are turned on, a closed circuit is configured in a path from the DC power supply 3 through the reactor L1, the switch element S1, and the switch element S2 to the reactor L2. The voltage from the DC power supply 3 is applied to a serial circuit of the reactor L1 and the reactor L2. As described above, the reactors L1, L2 are magnetically coupled and act as a transformer. If a coefficient of magnetic coupling of the reactors L1, L2 is increased and their numbers of turns are made to be equal, the voltage across the reactor L1 is equal to that of the reactor L2. Because of such operation, the voltage across the capacitor C1 connected in parallel to the reactor L1 is equal to that of the capacitor C2 connected in parallel to the reactor L2 (VC1=VC2).

Assume that self inductances for the reactors L1, L2 are indicated by La and a mutual inductance thereof is indicated by M, an inductance value Lt in the serial circuit of the reactors L1, L2 is calculated as $$Lt = 2 \cdot La + 2 \cdot M \quad (1)$$

An upward current value determined by voltage E of the DC power supply 3 and the inductance Lt flows (see IL1, IL2 in FIG. 2). During such flow, energy from the DC power supply 3 is accumulated as current in the reactors L1, L2.

When the switch elements S1, S2 are turned off, the current energy accumulated in the reactor L1 flows in a path from the reactor L1 through the diode D1, the capacitor C3, the capacitor C4, the diode D2, the reactor L2, and the DC power supply 3 to the reactor L1 and power is supplied to the output terminal. The current energy accumulated in the reactor L2 flows in a path from the reactor L2 through the DC power supply 3, the reactor L1, the diode D1, the capacitor C3, the capacitor C4, and the diode D2 to the reactor L2 and power is supplied to the output terminal.

At this moment, the following relationships are satisfied.

$$VC3 = VC1 + VL1 \quad (2)$$

$$VC4 = VC2 + VL2 \quad (3)$$

As described above, because the following relationships are satisfied, $$VC1 = VC2 \quad (4)$$

$$VL1 = VL2 \quad (5)$$

the following relationship is derived.

$$VC3 = VC4 \quad (6)$$

The first and the second booster circuits shown in FIG. 1 operate to divide the voltage of the DC power supply 3 and the output voltage in half.

If a ratio of time during which the switch elements S1, S2 are on (on-time ratio (also referred to as on duty)) is increased, currents passing through the reactors L1, L2 are also increased. Voltages across the capacitors C3, C4 (VC3, VC4) are thus increased. If the on-time ratio of the switch elements S1, S2 is decreased, the currents passing through the reactors L1, L2 are decreased. The voltages across the capacitors C3, C4 (VC3, VC4) are thus decreased. By adjusting the on-time ratio of the switch elements S1, S2, desired output voltage (VC3+VC4) is obtained for the voltage of the DC power supply 3.

The above-described control is performed by the control circuit 5 to which measured outputs of the voltage measuring units 6, 7 that measure the voltage across the pair of input capacitors (C1, C2) and the voltage across the pair of output capacitors (C3, C4) are inputted. In the configuration of FIG. 1, the first booster circuit is configured to be symmetric to the second booster circuit in terms of their arrangements and properties of their elements. As indicated by the above Equations (4) and (6), since voltages of the pair of input capacitors (C1, C2) and the pair of output capacitors (C3, C4) are equally divided in half, voltages across the pair of input capacitors (C1, C2) and the pair of output capacitors (C3, C4) are merely measured. Voltages of terminals of the capacitors C1 to C4 can be measured separately.

As described above, according to the power supply apparatus of the first embodiment, voltage applied to elements constituting the power supply apparatus can be about a half of at least one of the input voltage and the output voltage. A circuit that handles high input voltage and high output voltage is configured. As a result, low withstand voltage (general-purpose) parts are utilized for switch circuits, diodes, and capacitors. Switch elements and diodes that are compact and have an excellent switching property are utilized. A conversion efficiency of the power supply apparatus is thus improved. Because the capacitor withstand voltage is decreased, the circuit is made to be compact. By magnetically coupling the reactors that measure directly or indirectly terminal voltages of a pair of input capacitors (C1, C2) are placed between the respective capacitors. Voltage measuring units 8c, 8d that measure directly or indirectly terminal voltages of a pair of output capacitors (C3, C4) are placed between the respective capacitors. Since other configurations are the same as or equivalent to those of the first embodiment shown in FIG. 1, the same reference symbols are denoted to the constitutional parts and their detailed descriptions about configurations and connections will be omitted.

An operation of the power supply apparatus shown in FIG. 3 will be described with reference to FIGS. 3 and 4. FIG. 4 is a timing chart for explaining the operation of the power supply apparatus shown in FIG. 3. Meanings of symbols that represent voltages or currents in the relevant parts in the circuit are the same as in the first embodiment.

With reference to FIG. 4, if time t1 during which the switch element S1 is off is equal to time 2 during which the switch element S2 is off, i.e., t1=t2, a current waveform IL1 of the reactor L1 is equal to a current waveform IL2 of the reactor L2. If the switch elements S1, S2 are turned on, the same current flows from the DC power supply 3 into the capacitor C1 and the capacitor C2. The same operation as in the first embodiment is performed.

When the coefficient of magnetic coupling of the reactors L1, L2 is small, e.g., about 0.5, even if the number of turns of the reactor L1 is made to be coincide with that of the reactor L2 and the switch elements S1, S2 are simultaneously on/off controlled, because of the difference between switching speeds and the difference between on voltages in the switch elements S1, S2, voltage across the reactor L1 is different from that of the reactor L1, L2, voltages applied to the first and the second booster circuits are made to be equal. The inductance value of the reactors L1, L2 as a whole is increased by effects of the mutual inductance. The reactors L1, L2 are made to be compact and highly efficient.

As described above, according to the power supply apparatus of the first embodiment, the reactor that is included in the first booster circuit connected to the positive terminal side of the DC power supply is configured to be magnetically coupled to the reactor in the second booster circuit connected to the negative terminal side of the DC power supply. Based on voltages across the input capacitors and the output capacitors in the first and the second booster circuits, the switch elements included in the first and the second booster circuits are simultaneously on/off controlled. Each voltage applied to the elements constituting the first and the second booster circuits is about a half of at least one of the input voltage and the output voltage. The following effects are thus obtained. Use of high withstand voltage parts is suppressed. It is possible to avoid a larger and expensive device caused by special-purpose parts such as high withstand voltage parts. Because general-purpose parts with excellent performance are utilized, highly efficient power supply apparatus with excellent power conversion efficiency is provided.

Second Embodiment

Figure 3:
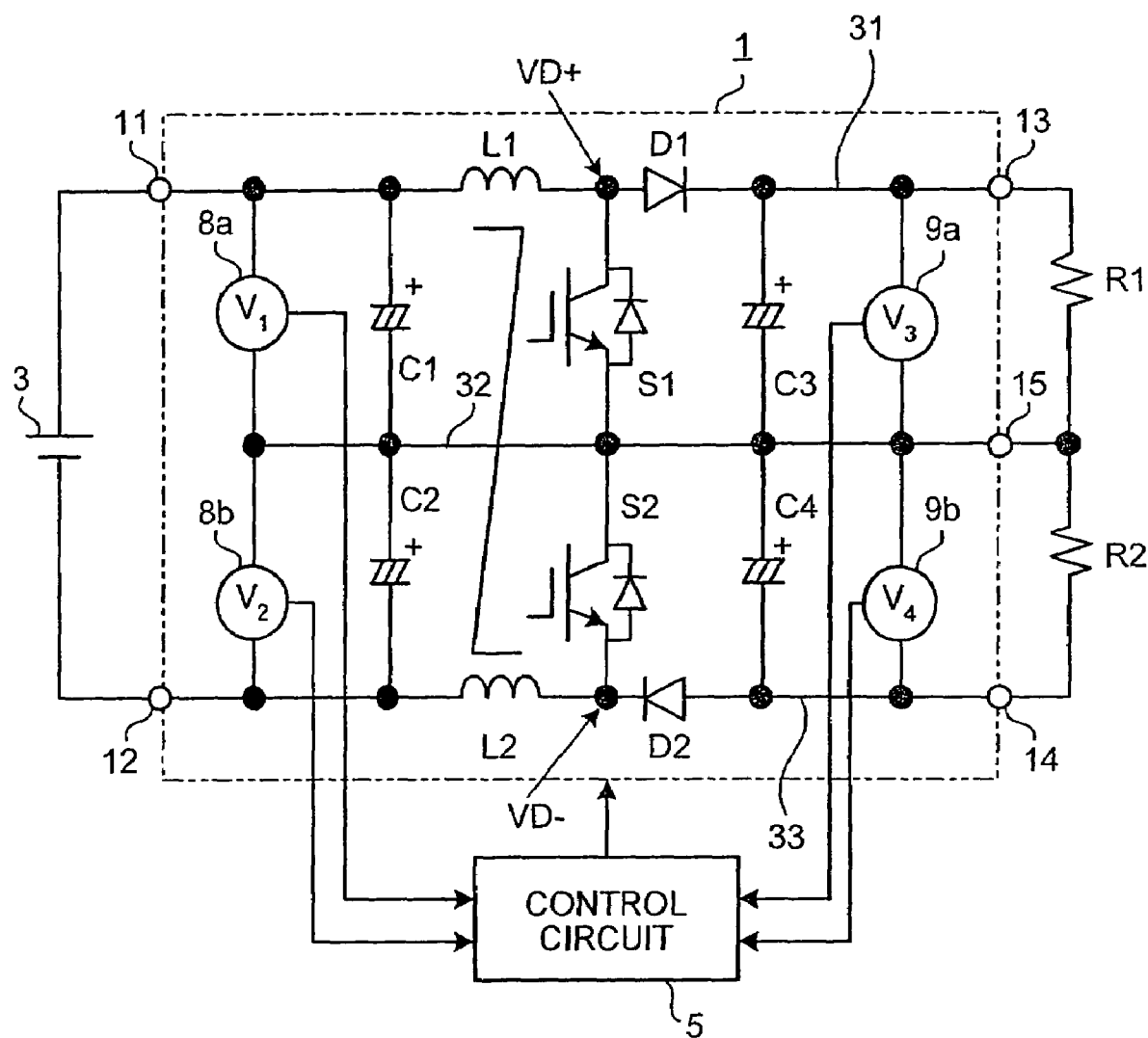
FIG. 3 is a circuit configuration diagram of a power supply apparatus according to a second embodiment of the present invention.
Figure 4:
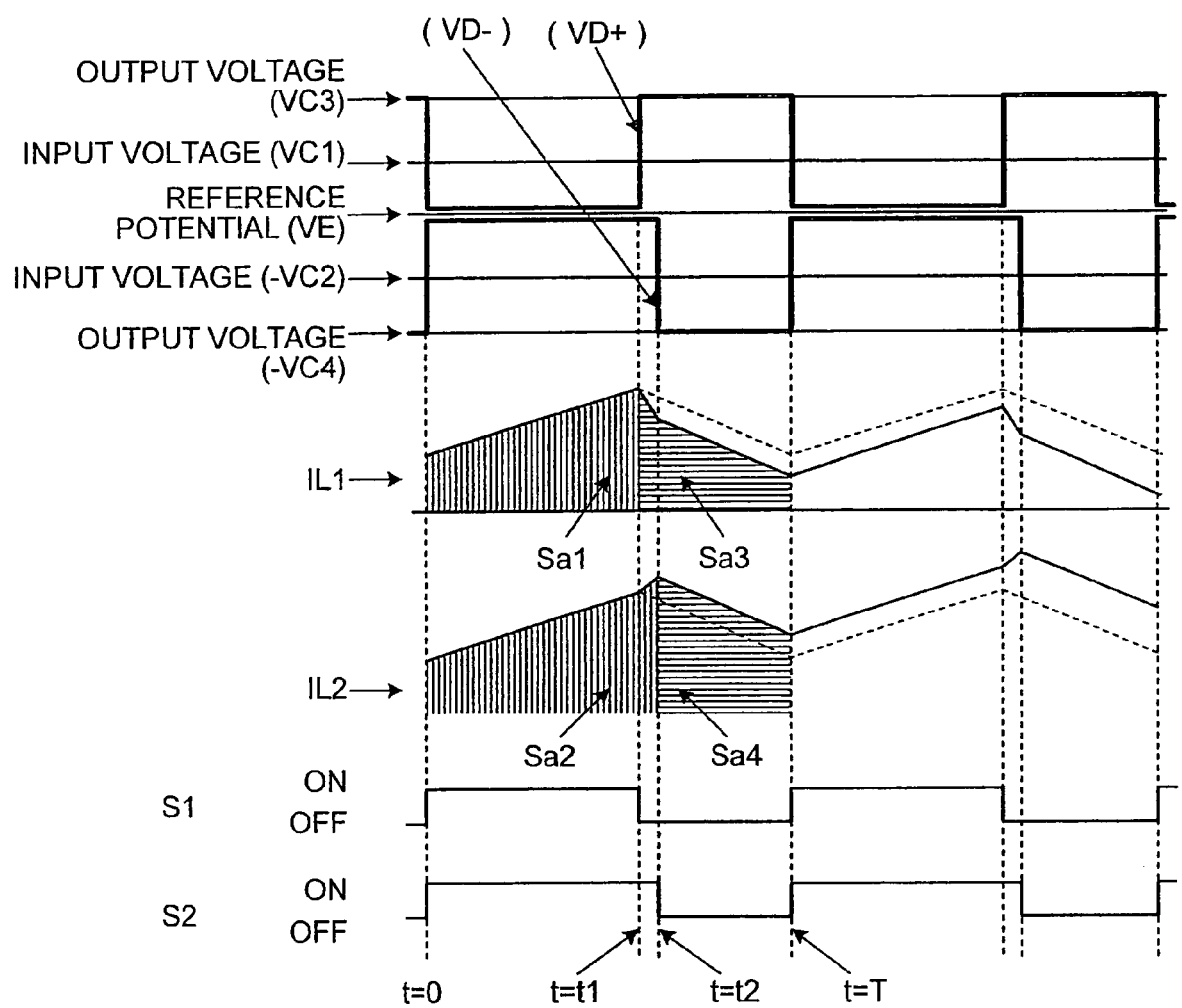
FIG. 4 is a timing chart for explaining the operation of the power supply apparatus shown in FIG. 3.

FIG. 3 is a circuit configuration diagram of a power supply apparatus according to a second embodiment of the present invention. In FIG. 3, arrangements and connection configurations of elements in the power supply apparatus of the second embodiment are the same as in the first embodiment. Unlike FIG. 1, voltage measuring units 8a, 8b L2. The voltage across the capacitor C1 is different from that of the capacitor C2, and the voltage across the capacitor C3 is different from that of the capacitor C4. Based on measured voltages obtained by measuring respective voltages across the capacitors C1 to C4, the switch elements S1, S2 are operated at different timings.

For example, if the voltage across the capacitor C1 is smaller than that of the capacitor C2, on-time of the switch element ,S2 is made to be longer than that of the switch element S1. Operations in this case will be described in detail by divided into three periods, i.e., a period from the time when the switch elements S1, S2 are simultaneously turned on (t=0) to the time when only the switch element S1 is turned off (t=0 to t1: first control period), a period during which the switch element S2 is turned off from on while the switch element S1 is kept to be off (t=t1 to t2: second control period), and a period during which the switch elements S1, S2 are kept to be off (t=t2 to T: third control period (T indicates time for a period)).

(First Control Period: t=0 to t1)

During the first control period, as described above, the switch element S1 is on and the switch element S2 is on. A closed circuit is configured in a path from the DC power supply 3 through reactor L1, the switch element S1, and the switch element S2 to the reactor L2. Voltage from the DC power supply 3 is applied to the serial circuit of the reactor L1 and the reactor L2. As described above, the reactors L1, L2 operate as a transformer. An inductance value Lt in the serial circuit of the reactors L1, L2 is calculated as $$Lt=2 \cdot La+2 \cdot M \qquad (1) \text{ (cited again)}$$

An upward current value determined by voltage E from the DC power supply 3 and the inductance Lt flows (see IL1, IL2 in FIG. 4). During such flow, energy from the DC power supply 3 is accumulated as current in the reactors L1, L2.

(Second Control Period: t=t1 to t2)

During the second control period, as described above, the switch element S1 is turned off from on, while the switch element S2 is kept to be on. The voltage across the reactor L1 is plus on the D1 side and current IL1 is decreased while being charged in the capacitor C3. The voltage across the reactor L2 is kept to be plus on the D2 side and is unchanged, and current IL2 is increased.

(Third Control Period: t=t2 to T)

During the third control period, as described above, the switch element S1 is kept to be off, while the switch element S2 is controlled to be off from on. The voltage across the reactor L2 is minus on the D1 side and the current IL2 is decreased while charged in the capacitor C4. In such state, the currents IL1, IL2 are decreased while charged in the capacitors C3, C4.

Electric charge flows in the first to third control periods will be described in detail. In FIG. 4, a vertical-striped hatching portion Sa1 (hereinafter, "vertical-striped portion Sa1") and a horizontal-striped hatching portion Sa3 (hereinafter, "horizontal-striped portion Sa3") shown on the waveform of the current IL1 indicate electric charge supplied from the capacitor C1. A vertical-striped hatching portion Sa2 (hereinafter, "vertical-striped portion Sa2") and a horizontal-striped hatching portion Sa4 (hereinafter, "horizontal-striped portion Sa4") shown on the waveform of the current IL2 indicate electric charge supplied from the capacitor C2. The horizontal-striped portion Sa3 for the current IL1 indicates electric charge to be supplied to the capacitor C3 and the horizontal-striped portion Sa4 for the current IL2 indicates electric charge to be supplied to C4.

As clear from FIG. 4, the relationship represented by Sa1+Sa3<Sa2+Sa4 is satisfied. That is, between electric charge Q1 taken out of the capacitor C1 and electric charge Q2 taken out of the capacitor C2, the relationship represented by Q1<Q2 is established. If the voltage across the capacitor C1 is smaller than that of the capacitor C2, the on-time of the switch element S2 is made to be longer than that of the switch element S1. More electric charges are thus taken out of the capacitor C2 as compared to the capacitor C1. A voltage balance between the capacitors C1, C2 is achieved.

In contrast, if the voltage across the capacitor C1 is larger than that of the capacitor C2, the on-time of the switch element S is made to be longer than that of the switch element S2. The voltage balance between the capacitors C1, C2 is achieved.

As described in the first embodiment, by varying the on-time ratio of the switch elements S1, S2, desired output voltage (VC3+VC4) is obtained for the voltage of the DC power supply 3.

As described above, according to the power supply apparatus of the second embodiment, when the coefficient of coupling of the reactors L1, L2 is decreased, an on/off timing of the switch element S2 relative to the switch element S1 or an on/off timing of the switch element S1 relative to the switch element S2 is adjusted. Voltages applied to the first and the second booster circuits are thus balanced.

As described above, according to the power supply apparatus of the second embodiment, the reactor included in first booster circuit connected to the positive terminal side of the DC power supply is configured to be magnetically coupled to the reactor included in the second booster circuit connected to the negative terminal side of the DC power supply. Based on voltages across the input capacitors and the output capacitors in the first and the second booster circuits, the switch element in the first booster circuit is made to be operated at a different timing from that of the switch element in the second booster circuit. In addition to the above-described effects of the first embodiment, an effect that imbalance of voltages applied to the first and the second booster circuits is equalized is obtained.

Third Embodiment

Figure 5:
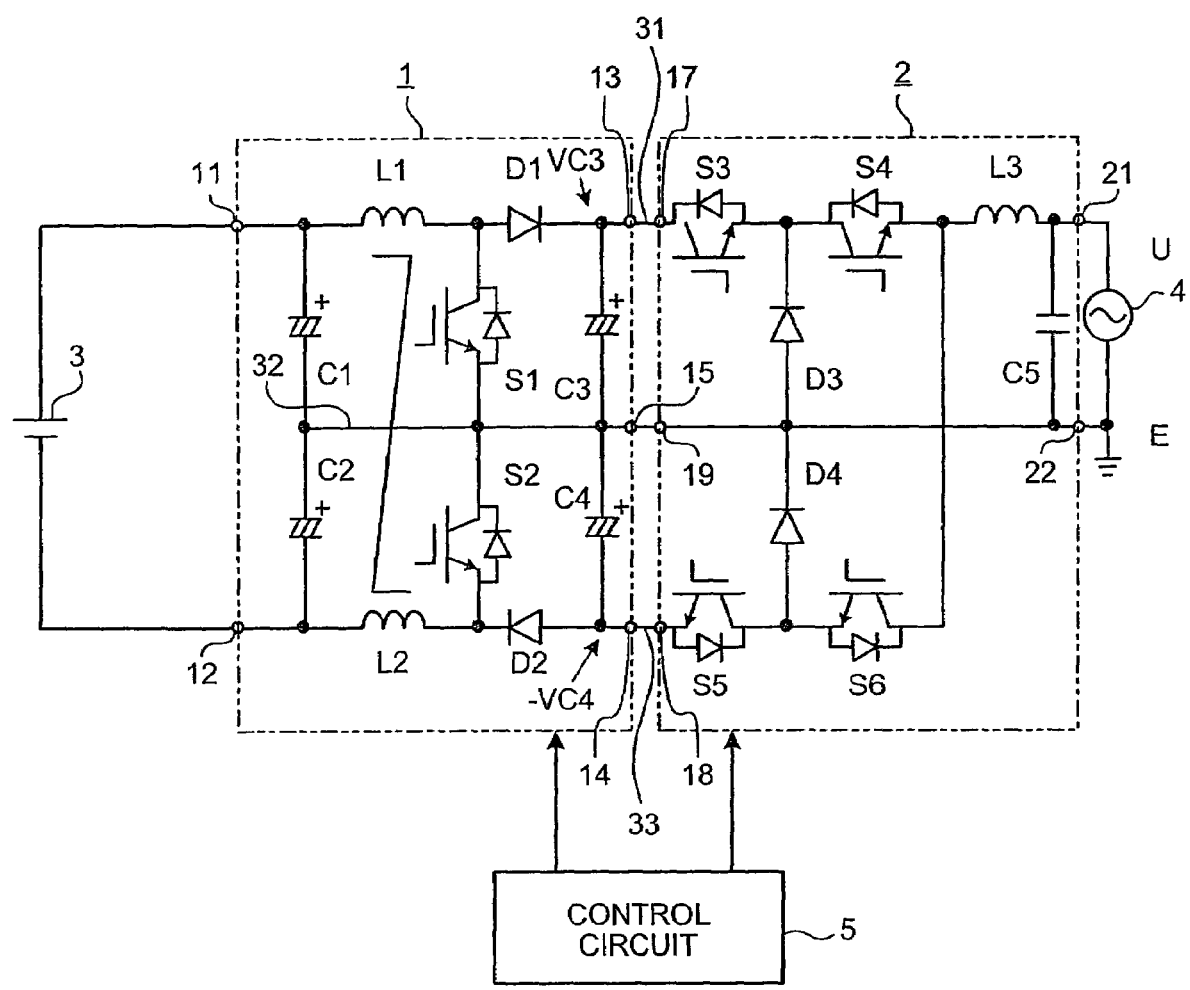
FIG. 5 is a circuit configuration diagram of a power supply apparatus according to a third embodiment of the present invention.

FIG. 5 is a circuit configuration diagram of a power supply apparatus according to a third embodiment of the present invention. According to the power supply apparatus shown in FIG. 5, at the output terminals 13, 14 and the intermediate voltage terminal 15 of the power supply apparatus shown in FIG. 1 or 3, a three-level inverter 2 that has input terminals 17, 18, an intermediate voltage terminal 19, and output terminals 21, 22 is connected. In the circuit configuration shown in FIG. 5, outputs of the DC power supply 3 are connected to the input terminals 11, 12 of the booster circuit 1 that constitutes the power supply apparatus. Connected to the output terminals 21, 22 of the three-level inverter 2 that constitutes the power supply apparatus is, e.g., a system power supply 4 for system interconnection.

A configuration of the three-level inverter that constitutes the power supply apparatus shown in FIG. 5 will be described. The three-level inverter 2 shown in FIG. 5 is configured to include an inverter circuit that has diodes D3, D4 and switch elements S3 to S6 and a low-pass filter that has an inductor L3 and a capacitor C5.

In the inverter circuit, at the DC bus 31 that connects the output terminal 13 of the booster circuit 1 to the input terminal 17 of the inverter circuit, from the near side of the booster circuit 1 (the input terminal 17), the switch elements S3, S4 that a diode is antiparallelly connected to a switch element such as an IGBT are inserted. Similarly, at the DC bus 33 that connects the output terminal 14 of the booster circuit 1 to the input terminal 18 of the inverter circuit, from the near side of the booster circuit 1 (the input terminal 18), the switch elements SS, S6 that a diode is antiparallelly connected to a switch element such as an IGBT are inserted. Within the inverter circuit, the cathode of the diode D3 is connected to a connected point of the switch elements S3 and S4 and the anode thereof is connected to the intermediate potential line 32 so that voltage between the DC bus 31 and the intermediate potential line 32 is clamped. Similarly, the anode of the diode D4 is connected to a connected point of the switch elements SS and S6 and the cathode thereof is connected to the intermediate potential line 32 so that voltage between the DC bus 33 and the intermediate potential line 32 is clamped.

In the low-pass filter, the capacitor C5 is connected in parallel to the output terminals 21, 22 of the three-level inverter 2. One terminal of the capacitor C5 is connected to one terminal of the inductor L3 and the other terminal of the capacitor C5 is connected to a connected point of the switch elements S4 and S6.

Figure 6:
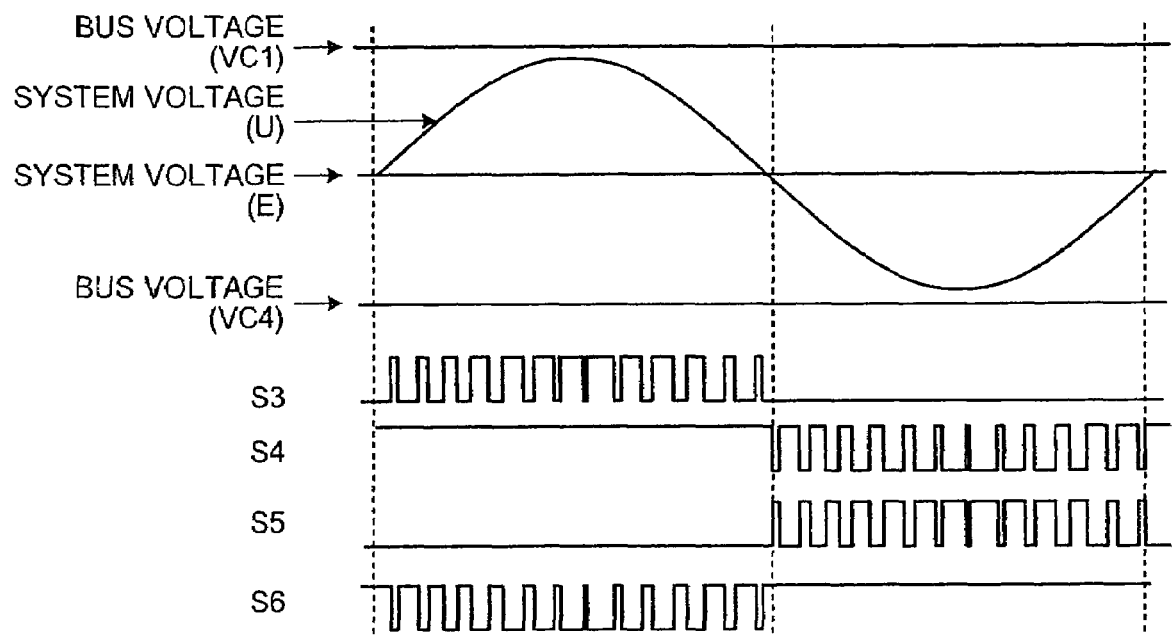
FIG. 6 is a timing chart for explaining the operation of the power supply apparatus shown in FIG. 5.

An operation of the power supply apparatus shown in FIG. 5 will be described with reference to FIGS. 5 and 6. FIG. 6 is a timing chart for explaining the operation of the power supply apparatus shown in FIG. 5. Meanings of symbols that represent voltages or currents in the relevant parts in the circuit are the same as in the first and the second embodiments.

With reference to FIG. 6, by performing switching control for the switch element S3 while the switch element S4 is always on and the switch element S5 is always off, during a period that the switch elements S3, S4 are on, a closed circuit is configured in a path from the capacitor C3 through the switch elements S3, S4, the inductor L3, and the capacitor C5 to the capacitor C3. When voltage allows the output terminal 21 to be the positive terminal, i.e., when output current of the three-level inverter is in a direction to be flown out of the output terminal (hereinafter, such state is referred to as "inverter positive output"), the voltage is supplied from the capacitor C3 to the system power supply 4. As shown in FIG. 6, by controlling the switch element S3 and the switch element S6 alternately and controlling on-time ratio thereof variably (PWM control), a voltage waveform that is interconnected to a voltage waveform of the system power supply 4 (see system voltage (U)) is outputted.

Similarly, by performing switching control for the switch element S5 while the switch element S6 is always on and the switch element S3 is always off, during a period that the switch elements S5, S6 are on, a closed circuit is configured in a path from the capacitor C4 through the capacitor C5, the inductor L3, and the switch elements S6, S5 to the capacitor C4. When voltage allows the output terminal 21 to be the negative terminal, i.e., when output current of the three-level inverter is in a direction to be flown into the output terminal (hereinafter, such state is referred to as "inverter negative output"), the voltage is supplied from the capacitor C4 to the system power supply 4. As shown in FIG. 6, by controlling of the switch elements S4 and the switch element S5 alternately and controlling on-time ratio thereof variably (PWM control), a voltage waveform that is interconnected to the voltage waveform of the system power supply 4 (see system voltage (U)) is outputted.

In the power supply apparatus with the above-described configuration according to the third embodiment, substantially equal positive and negative voltages are obtained from the booster circuit 1, and positive and negative power supplies required for operating the three-level inverter 2 are obtained. Voltage required for a single-sided amplitude value of the system power supply 4 is enough for withstand voltage required for the respective elements such as the capacitors C3, C4, the switch elements S3 to S6, and the diodes D3, D4. General-purpose elements that accomplish high speed switching and decreased loss are utilized, and the power conversion efficiency of the power supply apparatus is improved.

As described above, according to the power supply apparatus of the third embodiment, the input terminals of the three-level inverter are connected to the output terminals and the intermediate voltage terminal in the booster circuit and the output of the three-level inverter is connected via the low-pass filter to the AC power supply. In addition to the above-described effects of the first and the second embodiments, positive and negative power supplies required for operating the three-level inverter 2 are obtained.

Fourth Embodiment

Figure 7:
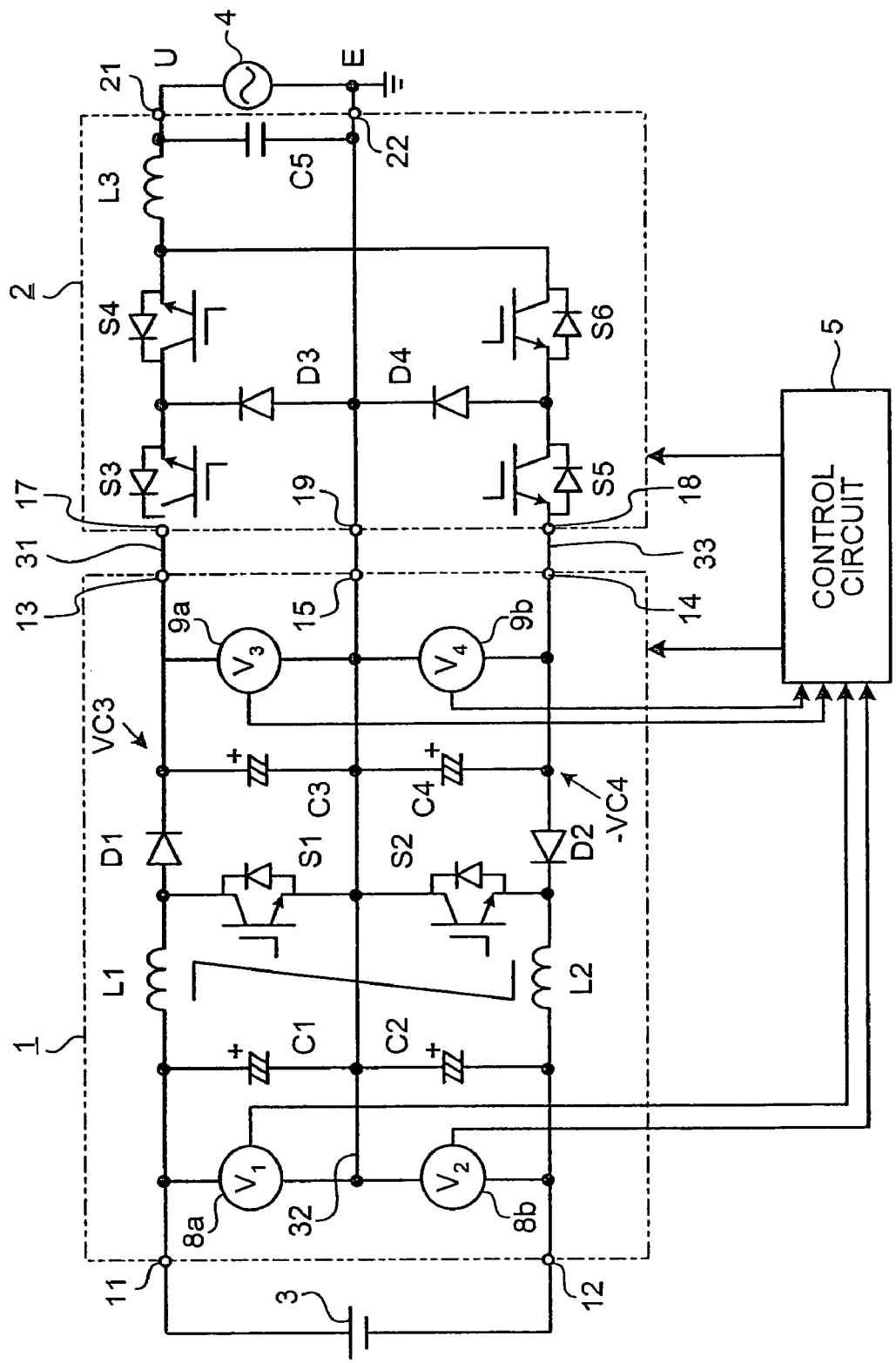
FIG. 7 is a circuit configuration diagram of a power supply apparatus according to a fourth embodiment of the present invention.

FIG. 7 is a circuit configuration diagram of a power supply apparatus according to a fourth embodiment of the present invention. In the power supply apparatus shown in FIG. 7, as the booster circuit in the power supply apparatus shown in FIG. 5, the booster circuit shown in FIG. 3 that measures terminal voltages of the capacitors C1 to C4 is utilized. Since other configurations are the same as or equivalent to those of the third embodiment shown in FIG. 5, like reference symbols are designated with like constitutional parts, and detailed explanations of configurations and connections thereof will be omitted.

Figure 8:
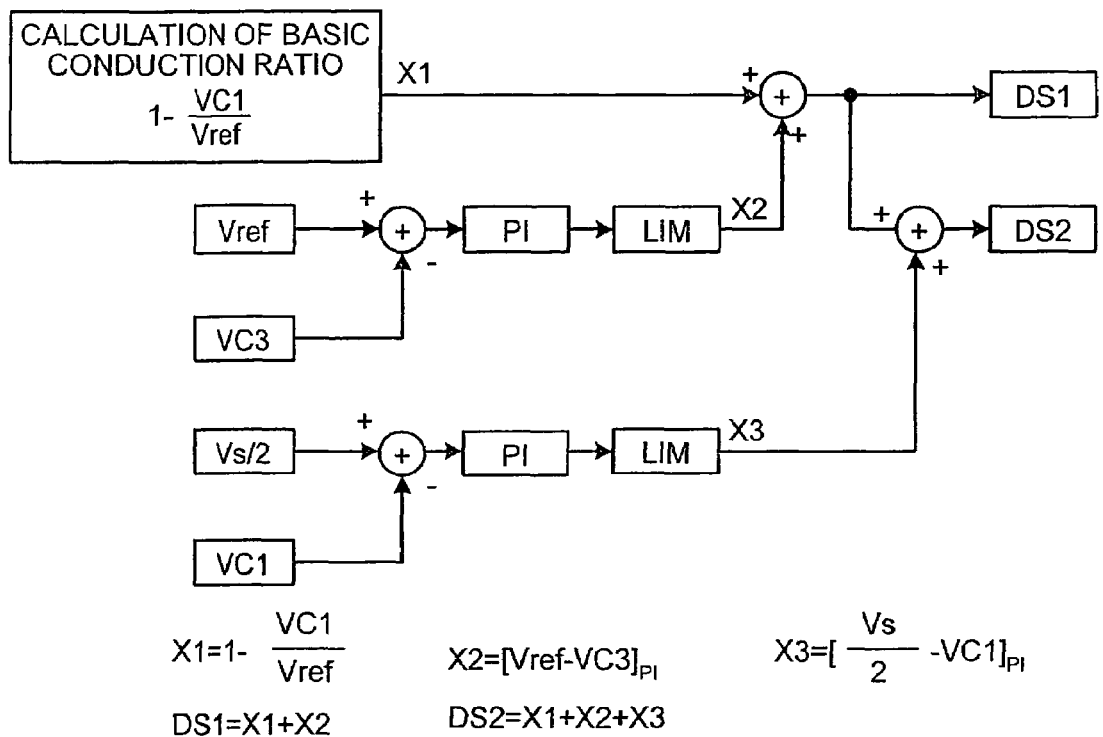
FIG. 8 is a diagram of control at a time of inverter positive output in the power supply apparatus shown in FIG. 7.
Figure 9:
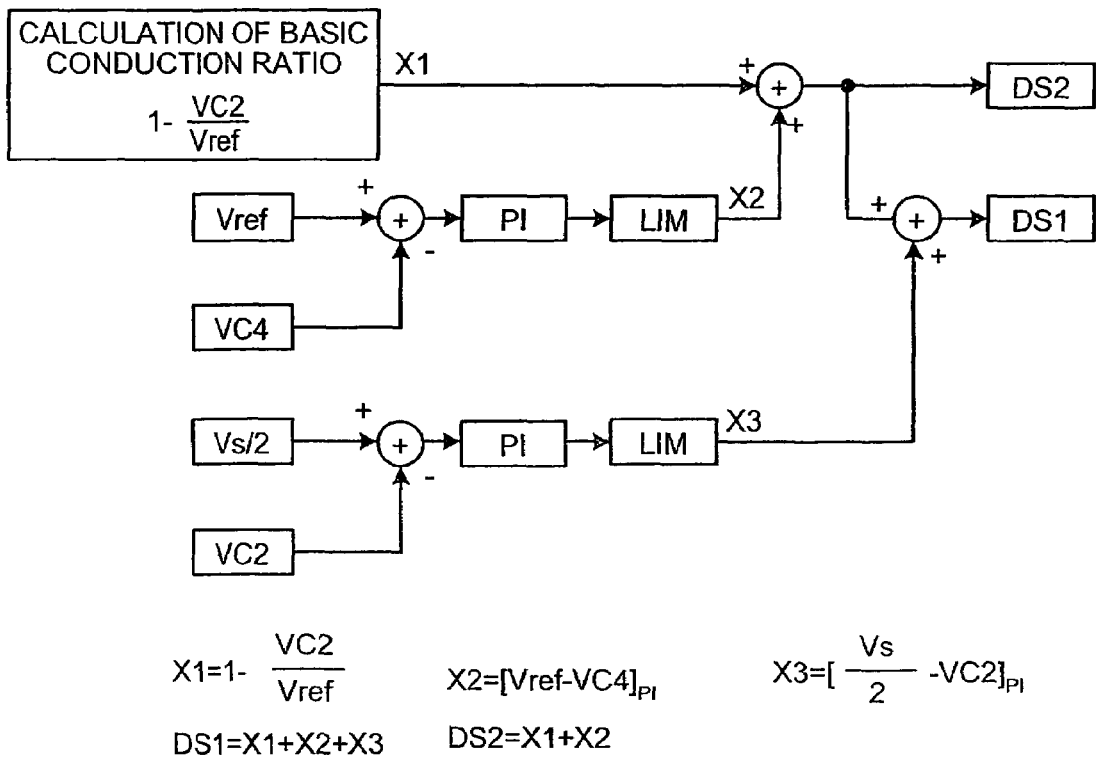
FIG. 9 is a diagram of control at a time of inverter negative output in the power supply apparatus shown in FIG. 7.

An operation of the power supply apparatus shown in FIG. 7 will be described with reference to FIGS. 7 to 9. FIG. 8 is a diagram of control at a time of inverter positive output in the power supply apparatus shown in FIG. 7, and FIG. 9 is a diagram of control at a time of inverter negative output in the power supply apparatus shown in FIG. 7. Meanings of symbols that represent voltages or currents in the relevant parts in the circuit are the same as in the first to third embodiments. In the fourth embodiment, control elements are defined by using the following symbols.

VS: voltage of the DC power supply 3 (VS=VC1+VC2)
Vref: target voltage of VC3 and VC4
DS1: on-time ratio of switch element S1
DS2: on-time ratio of switch element S2

An outline of the control in the power supply apparatus shown in FIG. 7 will be described. At the time of the inverter positive output, based on input voltage and output voltage of the first booster circuit (booster circuit on the positive output side) (i.e., VC1, VC3), the on-time ratio of the switch elements S1, S2 is controlled. At the time of the inverter negative output, based on input voltage and output voltage of the second booster circuit (booster circuit on the negative output side) (i.e., VC2, VC4), the on-time ratio of the switch elements S1, S2 is controlled.

Such controls will be described in further detail. These controls are implemented by the control circuit 5 included in the power supply apparatus.

In a case of the inverter positive output, control based on FIG. 8 is performed. In FIG. 8, a basic conduction ratio X1 is calculated. The basic conduction ratio X1 is given by the following Equation as shown in FIG. 8.

$$X1 = 1 - (VC1/Vref) \quad (7)$$

Upon a difference value between the target voltage Vref for VC3 and the measured voltage VC3 for the capacitor C3, a predetermined process is performed in a proportional-integral compensator (PI) and a limiter (LIM) to calculate a control value X2. This control value X2 is given by the following Equation as shown in FIG. 8.

$$X2 = Vref - VC3 \quad (8)$$

The on-time ratio DS1 of the switch element S1 is determined based on an additional value of these control values (X1+X2).

Implication of the control performed based on the Equations (7) and (8) is as follows. When the control value X2 is not given, control values to be added to the basic conduction ratio X1 do not exist. DS1 coincides with the basic conduction ratio X1. That is, the switch element S1 is subjected to switching control based on an on-time ratio determined by a boost ratio. When the voltage of the capacitor C3 is less than a target value, the control value X2 is positive and DS1 is larger. As a result, as described in the second embodiment, control is performed in a direction that the voltage VC3 of the capacitor C3 is increased. When the voltage of the capacitor C3 exceeds the target value, the control value X2 is negative and DS1 is smaller. The control is performed in a direction that the voltage VC3 of the capacitor C3 is decreased.

Similarly, upon a difference value between a half of the voltage of the DC power supply 3 (VS/2) and the measured voltage VC1 of the capacitor C1, each predetermined process is performed in the proportional-integral compensator (PI) and the limiter (LIM) to calculate a control value X3. This control value X3 is given by the following Equation as shown in FIG. 8.

$$X3 = (VS/2) - VC1 \quad (9)$$

The on-time ratio DS2 of the switch element S2 is determined based on an additional value of the calculated additional value (X1+X2) and the control value X3 calculated by Equation (9) (X1+X2+X3).

Implication of control performed based on Equations (7) to (9) is as follows. When the control values X2, X3 are not given, control values to be added to the basic conduction ratio X1 do not exist. DS2 coincides with the basic conduction ratio X1. That is, the switch element S2 is subjected to switching control based on the on-time ratio determined by the boost ratio. When the voltage of the capacitor C1 is less than a half of the voltage of the DC power supply 3 (VS/2), i.e., when the voltage of the capacitor C1 is less than the voltage of the capacitor C2, the control value X3 is positive and DS2 is larger. As a result, as described in the second embodiment, control is performed in a direction that the voltage VC1 of the capacitor C1 is increased more than the voltage VC2 of the capacitor C2. When the voltage of the capacitor C1 exceeds the voltage of the capacitor C2, the control value X2 is negative and DS2 is smaller. The control is performed in a direction that the voltage VC1 of the capacitor C1 is decreased less than the voltage VC2 of the capacitor C2.

Control at the time of the inverter negative output is the same as in FIG. 8 except that the target voltage and the measured voltage at a time of calculating the control value X2 are target voltage and measured voltage for the capacitor C4, respectively, and the measured voltage at a time of calculating the control value X3 are measured voltage for the capacitor C2. Detailed descriptions thereof will be thus omitted.

As a result of the above-described control, at the time of the inverter positive output, each on-time ratio of the switch elements S1, S2 is controlled so that the output voltage VC3 of the first booster circuit is constant. At the time of the inverter negative output, each on-time ratio of the switch elements S1, S2 is controlled so that the output voltage VC4 of the second booster circuit is constant. Imbalance of the voltages VC1, VC2 of the capacitors C1, C2 is prevented, and VC1 and VC2 are held at the same voltage.

When system interconnection is performed utilizing the three-level inverter, with respect to outputs supplied from the three-level inverter, in order that current can be outputted alternately from the positive side and the negative side every half cycle of a system period, the power supply apparatus must be in synchronization with such operation. According to the power supply apparatus of the fourth embodiment, as described above, based on the measured voltages of the capacitors C1 to C4, the amount of electric charges accumulated in these capacitors is controlled stably. The three-level inverter is thus operated stably.

As described above, according to the power supply apparatus of the fourth embodiment, when the output current of the three-level inverter is in a direction to be flown out of the output terminal of the three-level inverter, based on respective voltages across the input capacitor and the output capacitor in the booster circuit connected to the positive terminal side of the DC power supply, the on-time ratio of the switch elements S1, S2 is controlled. When the output current of the three-level inverter is in a direction to be flown into the output terminal of the three-level inverter, based on respective voltages across the input capacitor and the output capacitor in the booster circuit connected to the negative terminal side of the DC power supply, the on-time ratio of the switch elements S1, S2 is controlled. In addition to the above-described effects of the first to the third embodiments, an effect that the three-level inverter is operated stably is obtained.

INDUSTRIAL APPLICABILITY

As described above, the power supply apparatus of the present invention is useful for power supply apparatuses that boost DC voltage by switching for outputs.

The invention claimed is:

1. A power supply apparatus including an input terminal and an output terminal, the power supply apparatus boosting an output of a direct-current power supply connected to the input terminal and supplying a predetermined direct-current output to a load connected to the output terminal, the power supply apparatus comprising:
   a booster circuit that includes a first booster circuit and a second booster circuit each including an input capacitor, a reactor, a diode, a switch element, and an output capacitor, in which
      the reactors of the first booster circuit and the second booster circuit are magnetically coupled,
      terminals of a pair of input capacitors formed by connecting the input capacitor of the first booster circuit and the input capacitor of the second booster circuit in series are set as an input terminal,
      terminals of a pair of output capacitors formed by connecting the output capacitor of the first booster circuit and the output capacitor of the second booster circuit in series are set as an output terminal, and
      a connection terminal of the output capacitors is set as an-intermediate voltage terminal;
   a control circuit that controls the booster circuit; and
   a voltage measuring unit that measures either one of terminal voltages of each of the input capacitors and each of the output capacitors of the first booster circuit and the second booster circuit and terminal voltages of the pair of the input capacitors and the pair of the output capacitors in either one of a direct manner and an indirect manner, wherein
   the control circuit performs an on/off control of each of the switch elements of the first booster circuit and the second booster circuit simultaneously based on a result of measurement of the voltage measuring unit.

2. The power supply apparatus according to claim 1, wherein
   an input terminal of a three-level inverter is connected to the output terminal and the intermediate voltage terminal of the booster circuit, and
   an output of the three-level inverter is connected via a low-pass filter to an alternate-current power supply.

3. The power supply apparatus according to claim 2, wherein
   when an output current of the three-level inverter is in a direction of flowing out of an output terminal of the three-level inverter, an on-time ratio of each of the switch elements of the first booster circuit and the second booster circuit is controlled based on each of the terminal voltages of the input capacitor and the output capacitor included in either one of the first booster circuit and the second booster circuit which is connected to a positive terminal side of the direct-current power supply, and
   when the output current of the three-level inverter is in a direction of flowing into the output terminal of the three-level inverter, the on-time ratio of each of the switch elements of the first booster circuit and the second booster circuit is controlled based on each of the terminal voltages of the input capacitor and the output capacitor included in either one of the first booster circuit and the second booster circuit which is connected to a negative terminal side of the direct-current power supply.

4. A power supply apparatus including an input terminal and an output terminal, the power supply apparatus boosting an output of a direct-current power supply connected to the input terminal and supplying a predetermined direct-current output to a load connected to the output terminal, the power supply apparatus comprising:
   a booster circuit that includes a first booster circuit and a second booster circuit each including an input capacitor, a reactor, a diode, a switch element, and an output capacitor, in which
      the reactors of the first booster circuit and the second booster circuit are magnetically coupled,
      terminals of a pair of input capacitors formed by connecting the input capacitor of the first booster circuit and the input capacitor of the second booster circuit in series are set as an input terminal,
      terminals of a pair of output capacitors formed by connecting the output capacitor of the first booster circuit and the output capacitor of the second booster circuit in series are set as an output terminal, and
      a connection terminal of the output capacitors is set as an intermediate voltage terminal;
   a control circuit that controls the booster circuit; and
   a voltage measuring unit that measures terminal voltages of each of the input capacitors and each of the output capacitors of the first booster circuit and the second booster circuit in either one of a direct manner and an indirect manner, wherein
   the control circuit operates the switch element of the first booster circuit and the switch element of the second booster circuit at a different timing based on a result of measurement of the voltage measuring unit.

5. The power supply apparatus according to claim 4, wherein
   an input terminal of a three-level inverter is connected to the output terminal and the intermediate voltage terminal of the booster circuit, and
   an output of the three-level inverter is connected via a low-pass filter to an alternate-current power supply.

6. The power supply apparatus according to claim 5, wherein
   when an output current of the three-level inverter is in a direction of flowing out of an output terminal of the three-level inverter, an on-time ratio of each of the switch elements of the first booster circuit and the second booster circuit is controlled based on each of the terminal voltages of the input capacitor and the output capacitor included in either one of the first booster circuit and the second booster circuit which is connected to a positive terminal side of the direct-current power supply, and
   when the output current of the three-level inverter is in a direction of flowing into the output terminal of the three-level inverter, the on-time ratio of each of the switch elements of the first booster circuit and the second booster circuit is controlled based on each of the terminal voltages of the input capacitor and the output capacitor included in either one of the first booster circuit and the second booster circuit which is connected to a negative terminal side of the direct-current power supply.

* * * * *

UNITED STATES PATENT AND TRADEMARK OFFICE
CERTIFICATE OF CORRECTION

| | | |
|---|---|---|
| PATENT NO. | : 7,646,182 B2 | Page 1 of 1 |
| APPLICATION NO. | : 11/659209 | |
| DATED | : January 12, 2010 | |
| INVENTOR(S) | : Hirokazu Nakabayashi et al. | |

It is certified that error appears in the above-identified patent and that said Letters Patent is hereby corrected as shown below:

Title Page, Item 86 (PCT No.): change "PCT/JP2006/006517" to --PCT/JP2006/306517--.

Signed and Sealed this

Sixth Day of April, 2010

David J. Kappos
*Director of the United States Patent and Trademark Office*